United States Patent
Guo et al.

(10) Patent No.: US 9,160,757 B1
(45) Date of Patent: Oct. 13, 2015

(54) SYSTEMS AND METHODS FOR DETECTING SUSPICIOUS ATTEMPTS TO ACCESS DATA BASED ON ORGANIZATIONAL RELATIONSHIPS

(71) Applicant: Symantec Corporation, Mountain View, CA (US)

(72) Inventors: Fanglu Guo, Los Angeles, CA (US); Tao Cheng, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 38 days.

(21) Appl. No.: 14/207,503

(22) Filed: Mar. 12, 2014

(51) Int. Cl.
- G06F 21/00 (2013.01)
- H04L 29/06 (2006.01)
- G06F 21/44 (2013.01)
- G06F 21/30 (2013.01)

(52) U.S. Cl.
CPC ............ H04L 63/1408 (2013.01); G06F 21/30 (2013.01); G06F 21/44 (2013.01)

(58) Field of Classification Search
CPC .......... G06F 21/44; G06F 21/30; G06F 13/18
USPC ................ 726/23, 1; 705/51; 707/4; 455/555
See application file for complete search history.

(56) References Cited

U.S. PATENT DOCUMENTS

| | | | |
|---|---|---|---|
| 7,702,693 B1 * | 4/2010 | Aiyagari et al. | 707/785 |
| 8,600,995 B1 | 12/2013 | Satish et al. | |
| 2001/0042043 A1 * | 11/2001 | Shear et al. | 705/51 |
| 2002/0019246 A1 * | 2/2002 | Forte | 455/555 |
| 2007/0156670 A1 * | 7/2007 | Lim | 707/4 |
| 2008/0022357 A1 * | 1/2008 | Agarwal et al. | 726/1 |

OTHER PUBLICATIONS

Sandvine. Sandvine tethered device detection solution and service revenue enhancement. Case Study, 2011.*
Suomalainen, Jani. "Towards FineGrained Authorizations in Small Office and Home Networks." Systems and Networks Communications, 2007. ICSNC 2007. Second International Conference on. IEEE, 2007.*
Munro, Kirk, "Create your own org chart from AD with PowerGUI!", http://poshoholic.com/2009/06/27/create-your-own-org-chart-from-ad-with-powergui/, as accessed Jan. 22, 2014, (Jun. 27, 2009).

* cited by examiner

Primary Examiner — Syed Zaidi
(74) Attorney, Agent, or Firm — ALG INTELLECTUAL PROPERTY, LLC (57) ABSTRACT

A computer-implemented method for detecting suspicious attempts to access data based on organizational relationships may include (1) detecting an attempt by a computing device within an organization to access an additional computing device within the organization, (2) identifying, based on a directory service associated with the organization that classifies the computing device and the additional computing device, an organizational relationship between the computing device and the additional computing device, (3) determining, based on the organizational relationship between the computing device and the additional computing device, that the attempt by the computing device to access the additional computing device is suspicious, and (4) performing a security action in response to determining that the attempt by the computing device to access the additional computing device is suspicious. Various other methods, systems, and computer-readable media are also disclosed.

18 Claims, 7 Drawing Sheets

SYSTEMS AND METHODS FOR DETECTING SUSPICIOUS ATTEMPTS TO ACCESS DATA BASED ON ORGANIZATIONAL RELATIONSHIPS

BACKGROUND

In recent years, malicious individuals and organizations have created a variety of sophisticated targeted attacks aimed at high-profile or high-level entities, such as governments, corporations, political organizations, defense contractors, or the like. In many cases, the goal of such an attack is to gain access to highly sensitive or confidential information, such as financial information, defense-related information, and/or intellectual property (e.g., source code), and/or to simply disrupt an entity's operations. In order to prevent such attacks, organizations may take security measures to monitor and prevent such attacks coming from outside sources. Additional security measures may also be put in place to protect and prevent access to high value computing devices and systems from directed attacks by outside sources.

However, potentially malicious attacks that originate within an organization may be significantly more difficult to track and defend against than attacks originating outside the organization. Organizations often have numerous computing devices that frequently interact with each other in the course of normal operations. Any of these computing devices can potentially be compromised due to interactions with websites and emails containing malicious programs. Unfortunately, compromised machines within the organization may be utilized to launch attacks on other devices within the organization. While interactions between computing devices within an organization are often tracked, potentially malicious attacks between computing devices within the organization may go unnoticed by administrators due to the sheer number of such interactions taking place on a regular basis.

Accordingly, the instant disclosure identifies a need for systems and methods capable of identifying security threats originating within an organization, especially systems and methods capable of highlighting security threats directed at high value computing devices.

SUMMARY

As will be described in greater detail below, the instant disclosure describes various systems and methods for detecting data access attempts between computing devices within an organization that are suspicious based on the organizational relationships between the computing devices (e.g., relationships between the organizational groups to which the computing devices belong). In one example, a computer-implemented method for performing such a task may include (1) detecting an attempt by a computing device within an organization to access an additional computing device within the organization, (2) identifying, based on a directory service associated with the organization that classifies the computing device and the additional computing device (e.g., a directory service that includes data such as machine names, IP addresses, user names, organizational group names, device priority levels, and/or organizational group priority levels), an organizational relationship between the computing device and the additional computing device, (3) determining, based on the organizational relationship between the computing device and the additional computing device, that the attempt by the computing device to access the additional computing device is suspicious, and (4) performing a security action (e.g., notifying an administrator that the attempt by the computing device to access the additional computing device is suspicious) in response to determining that the attempt by the computing device to access the additional computing device is suspicious.

In some embodiments, the directory service may map the organizational relationship between the computing device and the additional computing device. The directory service map may also associate each of the computing device and the additional computing device with a different organizational group within the organization. In at least one embodiment, the step of determining that the attempt by the computing device to access the additional computing device is suspicious may include determining that the computing device is associated with a different organizational group than the additional computing device and/or determining that a device priority level assigned to the additional computing device exceeds a threshold device priority level. In some embodiments, the step of performing the security action may include presenting to the administrator a graphic illustrating an organizational group within the organization that is associated with the computing device and/or the additional computing device.

In at least one embodiment, the computer-implemented method may further include determining a threat level for the attempt by the computing device to access the additional computing device. For example, the threat level may be determined by a device priority level assigned to the additional computing device and/or by a disparity between a device priority level assigned to the computing device and a device priority level assigned to the additional computing device. In some embodiments, the security action may be based on the determined threat level.

In one embodiment, a system for implementing the above-described method may include (1) a detecting module, stored in memory, that detects an attempt by a computing device within an organization to access an additional computing device within the organization, (2) an identifying module, stored in memory, that identifies, based on a directory service associated with the organization that classifies the computing device and the additional computing device, an organizational relationship between the computing device and the additional computing device, (3) a determining module, stored in memory, that determines, based on the organizational relationship between the computing device and the additional computing device, that the attempt by the computing device to access the additional computing device is suspicious, (4) a security module, stored in memory, that performs a security action in response to determining that the attempt by the computing device to access the additional computing device is suspicious, and (5) at least one physical processor that executes the detecting module, the identifying module, the determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect an attempt by a computing device within an organization to access an additional computing device within the organization, (2) identify, based on a directory service associated with the organization that classifies the computing device and the additional computing device, an organizational relationship between the computing device and the additional computing device, (3) determine, based on the organizational relationship between the computing device and the additional computing device, that the attempt by the computing device to access the additional computing device is suspicious, and (4) perform a security action in response to determining that the attempt by the computing device to access the additional computing device is suspicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting suspicious attempts to access data based on organizational relationships. As will be explained in greater detail below, by detecting data access attempts between computing devices within an organization that are suspicious based on the organizational relationships between the computing devices (e.g., relationships between the organizational groups to which the computing devices belong), the systems and methods described herein may facilitate identification and prevention of potential threats originating from compromised computing devices within an organization. Embodiments of the instant disclosure may also provide various other advantages and features, as discussed in greater detail below.

Figure 1:
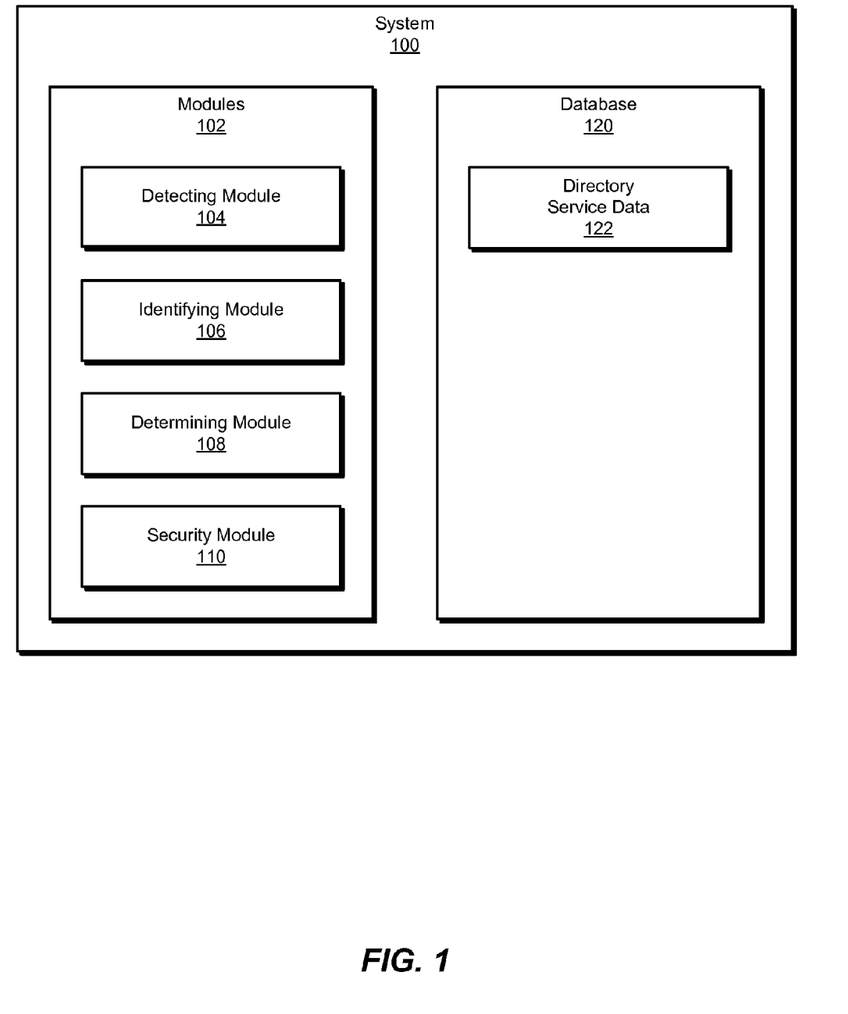
FIG. 1 is a block diagram of an exemplary system for detecting suspicious attempts to access data based on organizational relationships.
Figure 2:
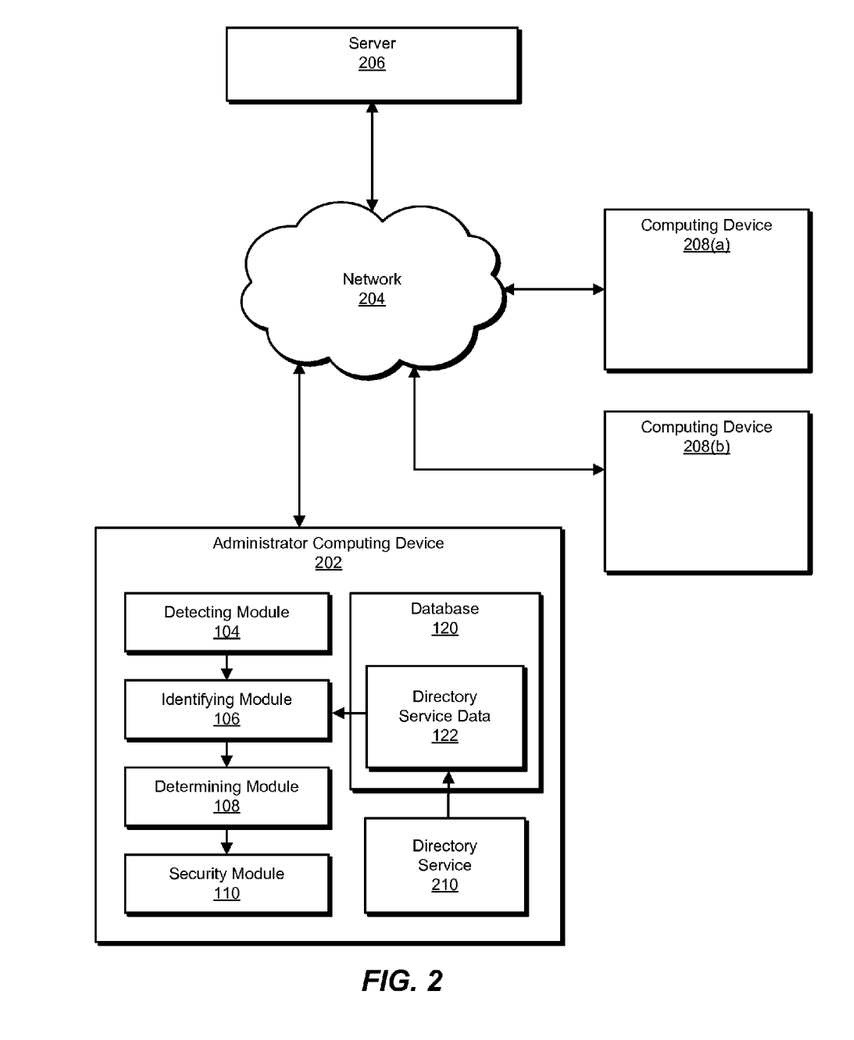
FIG. 2 is a block diagram of an additional exemplary system for detecting suspicious attempts to access data based on organizational relationships.

The following will provide, with reference to FIGS. 1-2, detailed descriptions of exemplary systems for detecting suspicious attempts to access data based on organizational relationships. Detailed descriptions of corresponding computer-implemented methods will also be provided in connection with FIG. 3. In addition, detailed descriptions of an exemplary organizational tree and an exemplary organizational map will also be provided in connection with FIGS. 4 and 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting suspicious attempts to access data based on organizational relationships. As illustrated in this figure, exemplary system 100 may include one or more modules 102 for performing one or more tasks. For example, and as will be explained in greater detail below, exemplary system 100 may include a detecting module 104 that detects an attempt by a computing device within an organization to access an additional computing device within the organization. Exemplary system 100 may also include an identifying module 106 that identifies, based on a directory service associated with the organization that classifies the computing device and the additional computing device, an organizational relationship between the computing device and the additional computing device.

In addition, and as will be described in greater detail below, exemplary system 100 may include a determining module 108 that determines, based on the organizational relationship between the computing device and the additional computing device, that the attempt by the computing device to access the additional computing device is suspicious. Exemplary system 100 may also include a security module 110 that performs a security action in response to determining that the attempt by the computing device to access the additional computing device is suspicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., administrator computing device 202, server 206, computing device 208(a), and/or computing device 208(b)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include directory service data 122 that correlates information (e.g., identification information and/or classification information) associated with computing devices, computing device users, and/or organizational groups (e.g., departments, subsidiaries, divisions, and/or locations) within an organization.

Database 120 may represent portions of a single database or computing device or a plurality of databases or computing devices. For example, database 120 may represent a portion of administrator computing device 202, server 206, computing device 208(a), and/or computing device 208(b) in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as administrator computing device 202, server 206, computing device 208(a), and/or computing device 208(b) in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include an administrator computing device 202 in communication with a server 206, computing device 208(a), and/or computing device 208(b) via a network 204. In one example, administrator computing device 202 may be programmed with one or more of modules 102 and/or may store all or a portion of the data in database 120. As illustrated in FIG. 2, administrator computing device 202 may also include a directory service 210 (e.g., active directory) that generates and stores directory service data 122 in database 120. Additionally or alternatively, server 206, computing device 208(a), and/or computing device 208(b) may be programmed with one or more of modules 102 and/or may store all or a portion of the data (e.g., directory service data 122) in database 120.

In one embodiment, one or more of modules 102 from FIG. 1 may, when executed by at least one processor of administrator computing device 202 (and/or server 206, computing device 208(a), and/or computing device 208(b)) enable administrator computing device 202 to detect suspicious attempts to access data based on organizational relationships. For example, and as will be described in greater detail below, one or more of modules 102 may cause administrator computing device 202 to (1) detect an attempt by a computing device within an organization (e.g., computing device 208(a)) to access an additional computing device within the organization (e.g., computing device 208(b)), (2) identify, based on a directory service (e.g., directory service 210) associated with the organization that classifies the computing device and the additional computing device, an organizational relationship between the computing device and the additional computing device, (3) determine, based on the organizational relationship between the computing device and the additional computing device, that the attempt by the computing device to access the additional computing device is suspicious, and (4) perform a security action in response to determining that the attempt by the computing device to access the additional computing device is suspicious.

Administrator computing device 202, computing device 208(a), and computing device 208(b) generally represent any type or form of computing device capable of reading computer-executable instructions. Examples of administrator computing device 202, computing device 208(a), and computing device 208(b) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of reading computer-executable instructions. Examples of server 206 include, without limitation, application servers and database servers configured to provide various database services and/or run certain software applications. In at least one example, server 206 may represent a domain name system (DNS) server that provides DNS information to administrator computing device 202 for use in assembling directory service data 122 stored in database 120.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between administrator computing device 202, server 206, computing device 208(a), and/or computing device 208(b).

Figure 3:
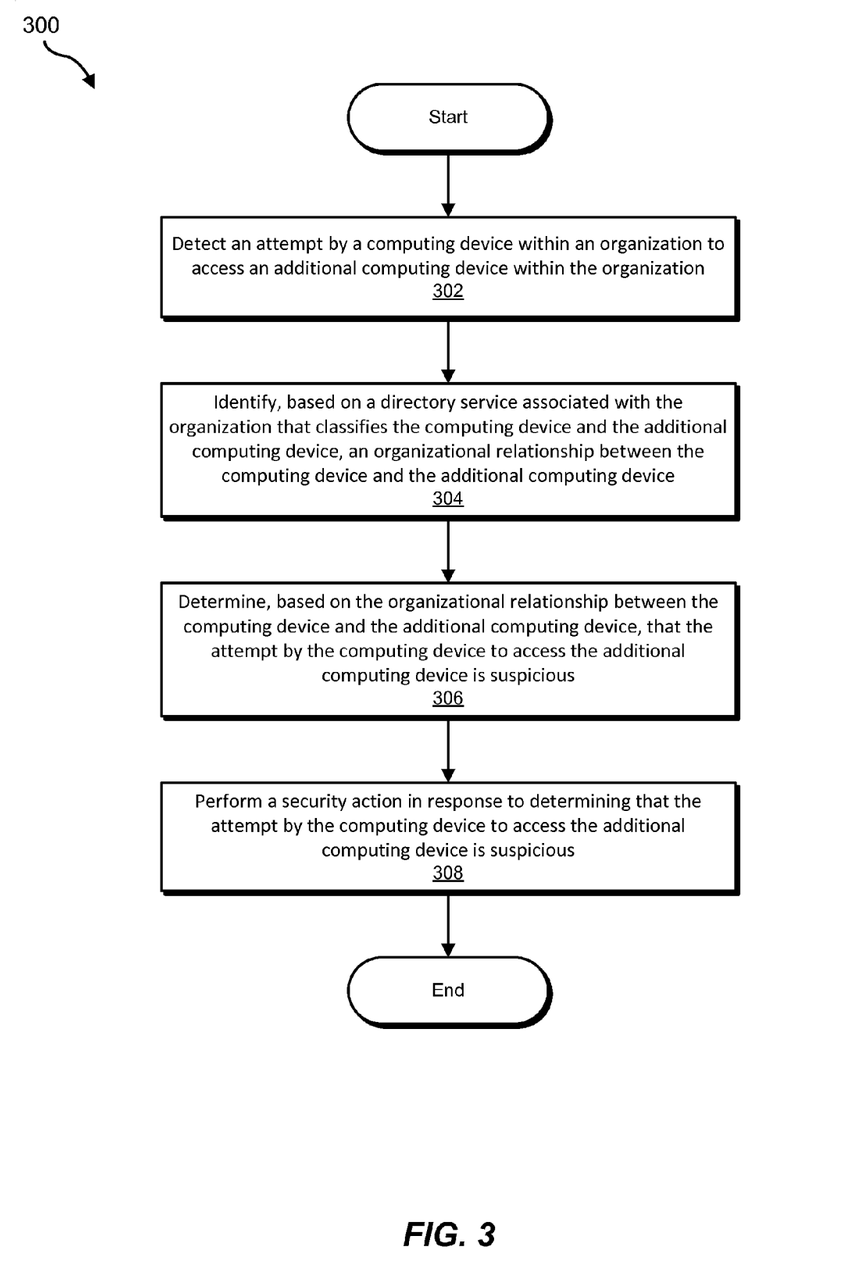
FIG. 3 is a flow diagram of an exemplary method for detecting suspicious attempts to access data based on organizational relationships.

FIG. 3 is a flow diagram of an exemplary computer-implemented method 300 for detecting suspicious attempts to access data based on organizational relationships. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect an attempt by a computing device within an organization to access an additional computing device within the organization. For example, detecting module 104 may, as part of administrator computing device 202 in FIG. 2, detect an attempt by computing device 208(a) to access computing device 208(b). In some embodiments, a target computing device may detect an attempt by another computing device to access the target computing device. For example, computing device 208(b) may include a detecting module that detects an attempt by computing device 208(a) to access computing device 208(b).

As used herein, the term "access" generally refers to the ability of a computing device to read, write, execute, delete, and/or otherwise manipulate and/or view data stored on another computing device. Access to a computing device may be restricted based on various access permissions (e.g., permissions limiting or excluding access by certain people and/or computing devices). However, attempts by a computing device to access data on another computing device may be detected regardless of whether the access attempts ultimately result in access to the data by the computing device.

The systems described herein may perform step 302 in any suitable manner. For example, detecting module 104 may detect an attempt by computing device 208(a) to access data on computing device 208(b). In some examples, detecting module 104 may monitor interactions between a plurality of computing devices within an organization. For example, detecting module 104 of administrator device 202, which may act as an organization gateway or server, may intercept and analyze traffic between computing device 208(a) and computing device 208(b). Attempts by one computing device within the organization to access data located on another computing device within the organization may also be detected by detecting module 104. In some embodiments, a record of such access attempts may be recorded and stored by detecting module 104 in, for example, database 120. As explained in greater detail below, the stored record of access attempts may be useful in later identification of potentially suspicious access attempts. In at least one embodiment, detecting module 104 may monitor and store a record of all interactions between computing devices within the organization.

At step 304, one or more of the systems described herein may identify, based on a directory service associated with the organization that classifies the computing device and the additional computing device, an organizational relationship between the computing device and the additional computing device. For example, identifying module 106 may, as part of administrator computing device 202 in FIG. 2, identify an organizational relationship between computing device 208(a) and computing device 208(b) based on directory service data 122 that is generated and stored in database 120 by directory service 210.

The phrase "directory service," as used herein, generally refers to a service that stores, organizes (e.g., maps), and/or provides access to information in a directory. In some embodiments, directory service 210 may generate classification data associated with each of computing device 208(a) and computing device 208(b). Additionally, directory service 210 may retrieve classification data associated with each of computing device 208(a) and computing device 208(b) from existing services. For example, directory service 210 may use various information associated with computing device 208(a) and computing device 208(b) to generate classification data for computing device 208(a) and computing device 208(b). For example, directory service 210 may identify, generate, and/or assign machine names, internet protocol (IP) addresses, user names, organizational group names, device priority levels, organizational group priority levels, and/or any other suitable data related to computing device 208(a) and/or computing device 208(b) for classification purposes. As will be explained in greater detail below, classification data may be utilized by directory service 210 to map organizational relationships between computing device 208(a), computing device 208(b), and/or any other computing device within the organization.

Figure 4:
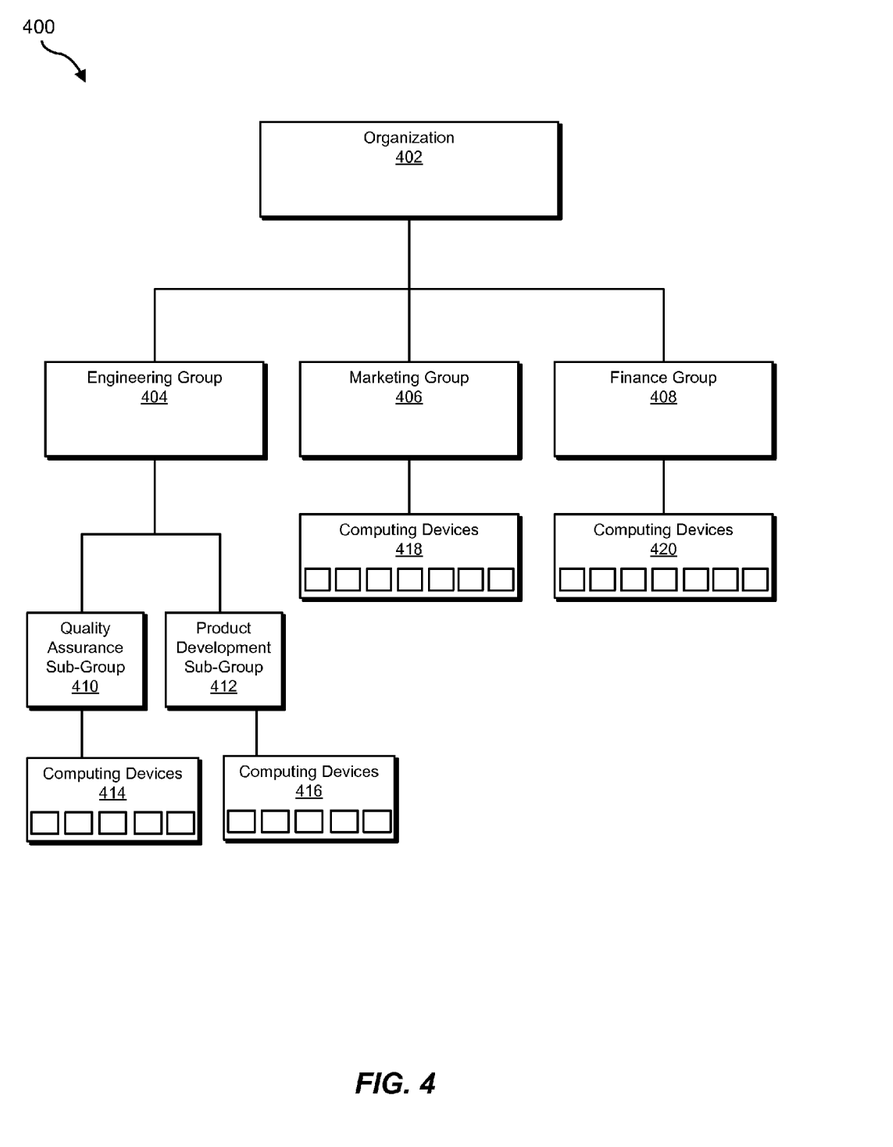
FIG. 4 is a block diagram of an exemplary organizational tree that may be utilized to detect suspicious attempts to access data.

In some instances, directory service 210 may map relationships between computing devices within an organization based on organizational groups and sub-groups. FIG. 4 illustrates an exemplary organizational tree 400 that may represent a structure utilized by directory service 210 to map relationships between computing devices based on organizational groups and sub-groups. As shown in FIG. 4, exemplary organizational tree 400 may include an organization 402 that includes engineering group 404, marketing group 406, finance group 408, quality assurance sub-group 410, and product development sub-group 412. Engineering group 404, marketing group 406, and finance group 408 may represent, for example, departments within an organization. In addition, quality assurance sub-group 410 and product development sub-group 412 may represent sub-groups within engineering group 404. Exemplary organizational tree 400 may also include computing devices 414-420 associated with the various groups and sub-groups.

Organizational tree 400 may also include any other suitable groups and/or sub-groups in addition to and/or alternatively to those illustrated in FIG. 4, without limitation. In some examples, sub-groups may be further broken down into smaller groups (e.g., sub-sub-groups, sub-sub-sub-groups, etc.) in order to more effectively map relationships between computing devices within organization 402. In some examples, organizational tree 400 may also represent any other suitable type of group and/or sub-group based on, for example, subsidiaries, divisions, locations (e.g., geographic locations, office locations), and/or hierarchical organization ranks of users (e.g., ranks based on pay grades, position titles, clearance levels, scopes of responsibility, and/or access privileges).

In one example, organizational tree 400 may associate each computing device with a suitable group and sub-group within organization 402. In at least one embodiment, computing device 208(a) and computing device 208(b) may each be associated with different groups and/or sub-groups within organization 402. For example, computing device 208(a) may represent one of computing devices 414 associated with quality assurance sub-group 410 and computing device 208(b) may represent one of computing devices 418 associated with marketing group 406. In addition, directory service 210 may map all computing devices 414-420 in organization 402 to their respective groups and sub-groups. In some embodiments, certain computing devices may be associated with more than one group and/or sub-group in the organization. For example, a computing device assigned to a company officer responsible for multiple departments within organization 402 may be associated with multiple groups that are within the officer's scope of responsibility.

Computing devices within organization 402 may be associated with groups and/or sub-groups in organizational tree 400 by associating information identifying the computing devices with the groups and/or sub-groups. For example, directory service 210 may associate information identifying computing device 208(a) and computing device 208(b) with the respective groups and sub-groups to which computing device 208(a) and computing device 208(b) belong. Information identifying computing devices may include, for example, machine names, IP addresses, and user names. In some embodiments, identification information, such as IP addresses, may be obtained from a DNS server (e.g., server 206). The identification information may be correlated with the groups and/or sub-groups of organization 402 and stored in directory service data 122 by directory service 210. Accordingly, identification module 106 may identify a specific computing device based on detection of an IP address by detecting module 104. The detected IP address may also enable identifying module 106 to quickly identify a user or users of the computing device and/or a group and/or sub-group (e.g., department) associated with the computing device.

In some embodiments, different priority levels may be assigned to different groups, sub-groups, and/or computing devices within organization 402. Such priority levels may be assigned by directory service 210 and stored in directory service data 122. The priority levels may indicate the relative importance of a particular computing device and/or the relative importance of a group and/or sub-group to which a computing device belongs. Priority levels may be assigned based on any desired criteria. For example, priority levels may be assigned based on the sensitivity of information on a particular computing device and/or based on the sensitivity of information on computing devices in general associated with a specific group or sub-group within organization 402. Any suitable factors may be utilized in assigning priority levels to groups, sub-groups, and/or computing devices. For example, computing devices within finance group 408 may be assigned a higher priority level then computing devices within quality assurance sub-group 410 based on the higher overall value of assets managed by computing devices in finance group 408.

Returning to FIG. 3, at step 306 one or more of the systems described herein may determine, based on the organizational relationship between the computing device and the additional computing device, that the attempt by the computing device to access the additional computing device is suspicious. For example, determining module 108 may, as part of administrator computing device 202 in FIG. 2, determine that the attempt by computing device 208(a) to access computing device 208(b) is suspicious based on the organizational relationship between computing device 208(a) and computing device 208(b) identified by identifying module 106.

The systems described herein may perform step 306 in a variety of ways. In at least one embodiment, determining module 108 may determine that the attempt by computing device 208(a) to access computing device 208(b) is suspicious based on computing device 208(a) and computing device 208(b) being associated with different organizational groups and/or sub-groups. For example, computing device 208(a) may be one of computing devices 414 associated with quality assurance sub-group 410 within engineering group 404 illustrated in FIG. 4. In contrast, computing device 208(b) may be one of computing devices 418 associated with marketing group 406. Because computing device 208(a) associated with engineering group 404 attempted to access computing device 208(b) associated with marketing group 406, determining module 108 may determine that the access attempt is suspicious. On the other hand, an attempt by a computing device 414 associated with quality assurance sub-group 410 to access another computing device 414 may not be determined by determining module 108 to be suspicious since the access attempt takes place between computers within the same group and sub-group.

In at least one embodiment, determining module 108 may be configured to allow some access attempts between computing devices within different groups and/or sub-groups. For example, an attempt by a computing device 414 of quality assurance sub-group 410 to access a computing device 416 of product development sub-group 412 may not be determined to be suspicious since the activities of quality assurance sub-group 410 and product development sub-group 412 may be closely related and/or access to data between quality assurance sub-group 410 and product development sub-group 412 may be routine and may serve a legitimate business purpose or other suitable purpose.

In some instances, an attempt by a computing device associated with one group, such as a computing device 418 associated with marketing group 406, to access a computing device associated with another group, such as a computing device 416 associated with product development sub-group 412 of engineering group 404, may not be determined to be suspicious in certain circumstances. For example, the activities of marketing group 406 and product development sub-group 412 may be closely related and/or access to data between marketing group 406 and product development sub-group 412 may be routine and may serve a legitimate business purpose or other suitable purpose.

In at least one embodiment, certain access attempts between computing devices in different groups and/or sub-groups may be determined to be suspicious in some circumstances and may be determined to not be suspicious in other circumstances. For example, an attempt by a computing device 418 associated with marketing group 406 to access a computing device 420 associated with finance group 408 may be determined to be suspicious. Conversely, an attempt by a computing device 420 of finance group 408 to access a computing device 418 of marketing group 406 may not be determined to be suspicious since the computing device 420 associated with finance group 408 may be determined to be more likely to have a legitimate business purpose or other suitable purpose for accessing the computing device 418 associated with marketing group 406.

In some embodiments, computing devices that are associated with more than one group and/or sub-group in organization 402 may attempt to access other computing devices associated with any of those same groups and/or sub-groups without triggering a determination by determining module 108 that such access attempts are suspicious. For example, a computing device associated with both engineering group 404 and marketing group 406 may attempt to access computing devices 414 associated with quality assurance sub-group 410, computing devices 416 associated with product development sub-group 412, and/or computing devices 418 associated with marketing group 406 without determining module 108 determining that such access attempts are suspicious.

In some instances, access attempts between computing devices associated with different groups and/or subgroups within organization 402 may be determined to be suspicious only if certain computing devices (e.g., high-value computing devices, computing devices containing proprietary and/or confidential information) are the originator or target of such access attempts. For example, an attempt by a computing device 418 associated with marketing group 406 to access a computing device 420 associated with finance group 408 may be determined to be suspicious only if a high priority computing device 420 is targeted, while other access attempts may be determined to not be suspicious. In some examples, an access attempt may be determined to be a suspicious access attempt if a priority level of a computing device involved in the access attempt exceeds a threshold device priority level.

In various embodiments, access attempts that are determined by determining module 108 to be suspicious may be ranked in terms of seriousness of the potential threat. For example, some access attempts that are determined to be suspicious may additionally be determined by determining module 108 to have a higher threat level than other suspicious access attempts. Any suitable factors may be utilized in the determination of a threat level of a suspicious access attempt. For example, determining module 108 may determine the priority level of the group, sub-group, and/or computing device that is targeted by the access attempt. Specifically, a suspicious attempt to access a computing device having a priority level exceeding a threshold priority level may be determined to have a higher threat level than a suspicious attempt to access a computing device having a lower priority level that does not exceed the threshold priority level. In at least one example, a threat level may be determined based on a disparity between device priority levels assigned to computing devices involved in an access attempt.

In some embodiments, a suspicious access attempt made, for example, by a computing device within an organizational group that has had a history of compromised computing devices, malicious attacks against other computing devices, and/or numerous suspicious access attempts within a specified time frame may be determined by determining module 108 to pose a more serious potential threat. In some examples, an access attempt between organizational sub-groups within a single organizational group may be determined to pose a less serious potential threat than an access attempt between two separate organizational groups.

Returning to FIG. 3, at step 308 one or more of the systems described herein may perform a security action in response to determining that the attempt by the computing device to access the additional computing device is suspicious. For example, security module 110 may, as part of administrator computing device 202 in FIG. 2, perform a security action in response to determining module 108 determining that the attempt by computing device 208(a) to access computing device 208(b) is suspicious.

The systems described herein may perform step 308 in any suitable manner. For example, security module 110 may, in response to determining that an attempt by computing device 208(a) to access computing device 208(b) is suspicious, (1)

notify an administrator concerning the suspicious access attempt and the computing devices and/or organizational groups involved in the suspicious access attempt, (2) scan computing device 208(a), computing device 208(b), and/or other computing devices associated with the involved organizational groups and/or sub-groups for malware, (3) block access attempts made by computing device 208(a), computing device 208(b), and/or other computing devices associated with the involved organizational groups and/or sub-groups, and/or (4) delete, quarantine, disarm, neutralize, and/or otherwise prevent a user from opening or accessing documents from computing device 208(a), computing device 208(b), and/or other computing devices associated with the involved organizational groups and/or sub-groups. In some examples, the security action taken may be based on a threat level posed by a suspicious access attempt.

Figure 5:
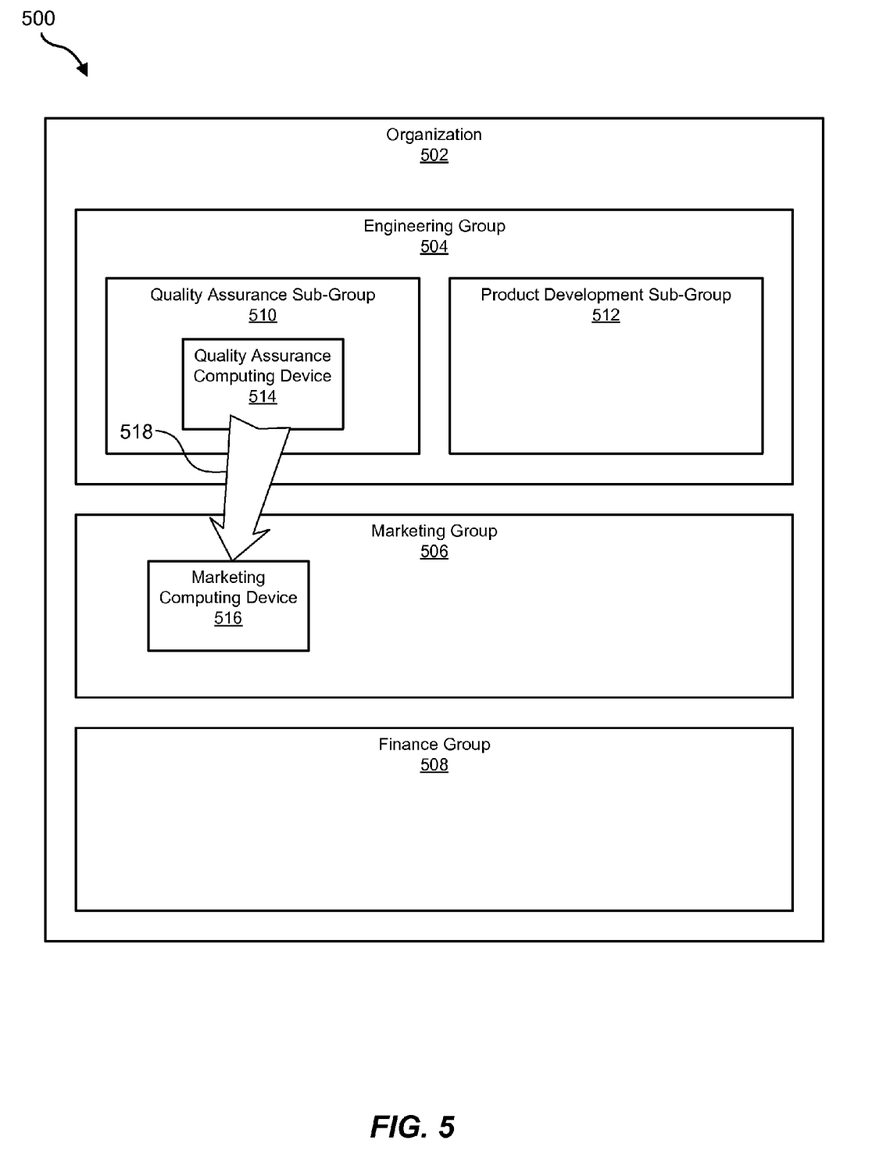
FIG. 5 is an illustration of an exemplary organizational map for notifying a user of suspicious attempts to access data.

FIG. 5 is an illustration of an exemplary organizational map 500 for notifying a user, such as an administrator, of suspicious attempts to access data. According to various embodiments, organizational map 500 may be displayed on a monitor of administrator computing device 202 in FIG. 2 so as to be visible to an administrator or other user. Organizational map 500 may include a plurality of organizational map elements corresponding to exemplary organizational tree 400 illustrated in FIG. 4. For example, as shown in FIG. 5, exemplary organizational map 500 may include a section labeled organization 502 that includes an engineering group 504, a marketing group 506, a finance group 508, a quality assurance sub-group 510, and a product development sub-group 512.

In one example, organizational map 500 may be utilized by security module 110 to notify the administrator concerning suspicious attempts to access data. For example, organizational map 500 may provide a view that facilitates identification by the administrator of access attempts that have been determined by determining module 108 to be suspicious. Additionally, organizational map 500 may facilitate and simplify identification of computing devices, groups, and/or sub-groups involved in any suspicious data access attempts.

For example, quality assurance computing device 514 associated with quality assurance sub-group 510 of engineering group 504 may attempt to access marketing computing device 516 associated with marketing group 506. In this example, determining module 108 may determine, based at least on quality assurance computing device 514 and marketing computing device 516 being associated with different groups within organization 502, that the access attempt is suspicious. In response, security module 110 may update organizational map 500 to indicate that a suspicious access attempt has been made. For example, as illustrated in FIG. 5, organizational map 500 may display quality assurance computing device 514 and marketing computing device 516 within quality assurance sub-group 510 and marketing group 506, respectively, thus providing an indication of the specific computing devices involved in the suspicious access attempt and the locations of the computing devices within organization 502.

In some examples, an image graphic may be displayed in organizational map 500 to indicate the originator and the target of the suspicious access attempt. For example, as shown in FIG. 5, an arrow 518 may be displayed on organizational map 500 so as to allow an administrator to quickly see that an attempt was made by quality assurance computing device 514 to access marketing computing device 516. Arrow 518 may also enable the administrator to quickly see that the access attempt originated in quality assurance sub-group 510 and was directed at a device in marketing group 506.

In various embodiments, colors may be displayed in portions of organizational map 500 so as to visually highlight sources and/or targets of suspicious access attempts. For example, quality assurance sub-group 510 may be changed to a color that stands out from other portions of organizational map 500 and that indicates a source and/or a target group, sub-group, and/or computing device of a suspicious access attempt. For example, quality assurance sub-group 510 and/or marketing group 506 may be highlighted (e.g., shaded, outlined, and/or surrounded) with a color, such as a bright color, that stands out from other portions of organizational map 500.

In some examples, different types of indication graphics may be utilized to distinguish between different types of access attempts. For example, different highlight colors may be displayed depending on the determined threat level posed by a suspicious access attempt and/or based on the frequency of suspicious access attempts over a specified time period. For example, quality assurance sub-group 510 and/or marketing group 506 may be shaded yellow if the illustrated access attempt is ranked as a less serious potential threat. Alternatively, quality assurance sub-group 510 and/or marketing group 506 may be shaded red if the illustrated access attempt is ranked as a more serious potential threat.

In at least one embodiment, organizational map 500 may comprise an interactive map that may be modified in response to user input. For example, an administrator may turn off or temporarily ignore various indicator and/or warning elements, such as arrow 518, displayed on organizational map 500. In some examples, the administrator may select certain portions of organizational map 500 to obtain additional information concerning selected elements of organization 502. For example, the administrator may click on any of the image elements, such as quality assurance computing device 514, marketing computing device 516, quality assurance sub-group 510, marketing group 506, and/or arrow 518 to obtain additional information concerning the computing devices, groups, and/or sub-groups associated with a suspicious access attempt. Accordingly, organizational map 500 may provide an administrator with a quick and informational view of the organization and any suspicious access attempts within the organization, while enabling the administrator to easily obtain additional data concerning the suspicious access attempts and the computing devices, groups, and/or sub-groups associated with the suspicious access attempts.

As explained above, by detecting data access attempts between computing devices within an organization that are suspicious based on the organizational relationships between the computing devices (e.g., relationships between the organizational groups to which the computing devices belong), the systems and methods described herein may facilitate and simplify identification and prevention of potential threats originating from compromised computing devices within an organization.

Moreover, in at least some examples, by providing administrators with an organizational map of the organization illustrating information concerning which computing devices, groups, and/or sub-groups are associated with a suspicious access attempt, the systems and methods described herein may provide administrators with a holistic view of the organization that allows for easy identification of potential malicious threats. Such a configuration may greatly reduce the amount of time required to sift through large amounts of data to identify potential threats to computing devices within the organization. Additionally, as described in certain embodiments, by determining and illustrating whether a potential attack poses a more or less serious threat, the systems and methods described herein may facilitate discrimination between suspicious access attempts that are potentially harmful and suspicious access attempts that are more likely to not be malicious.

Figure 6:
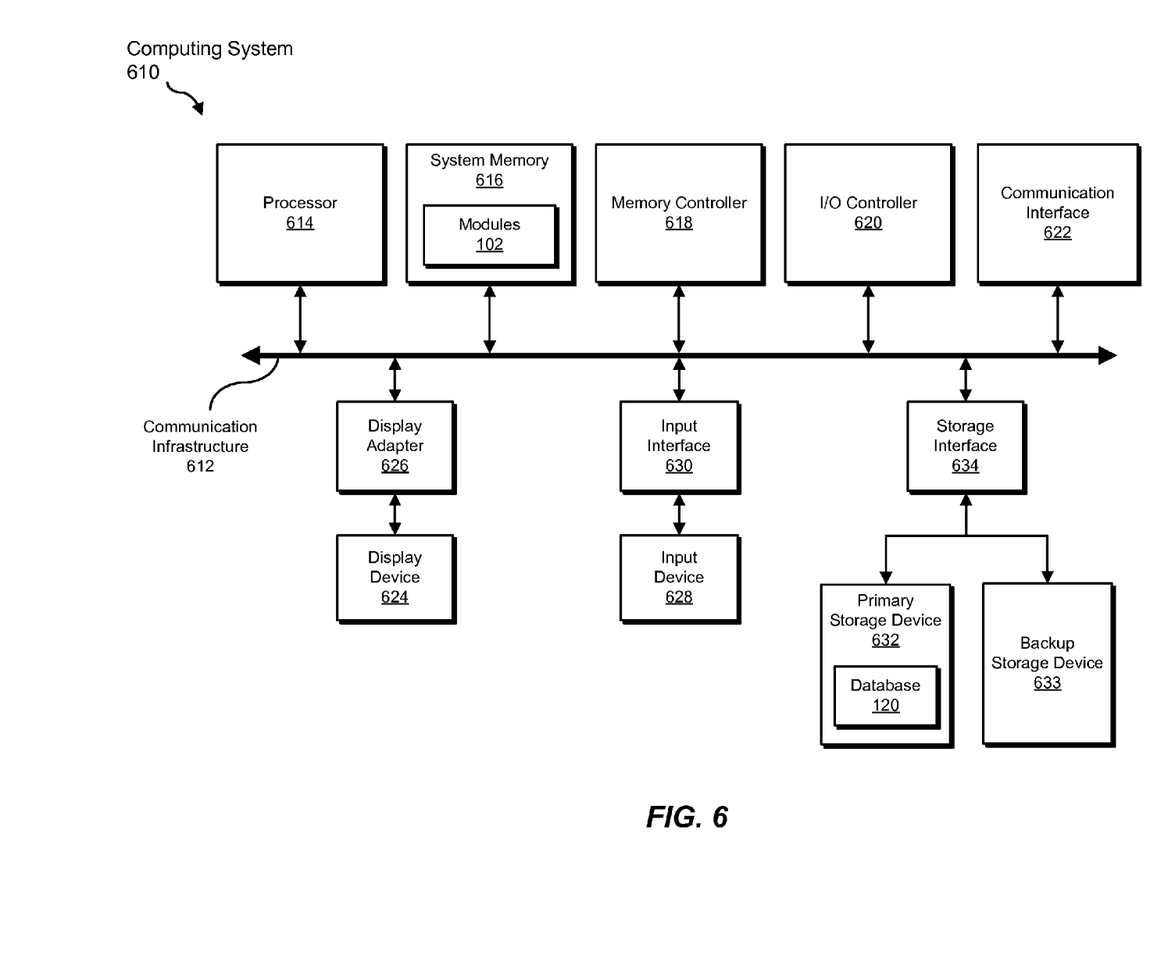
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
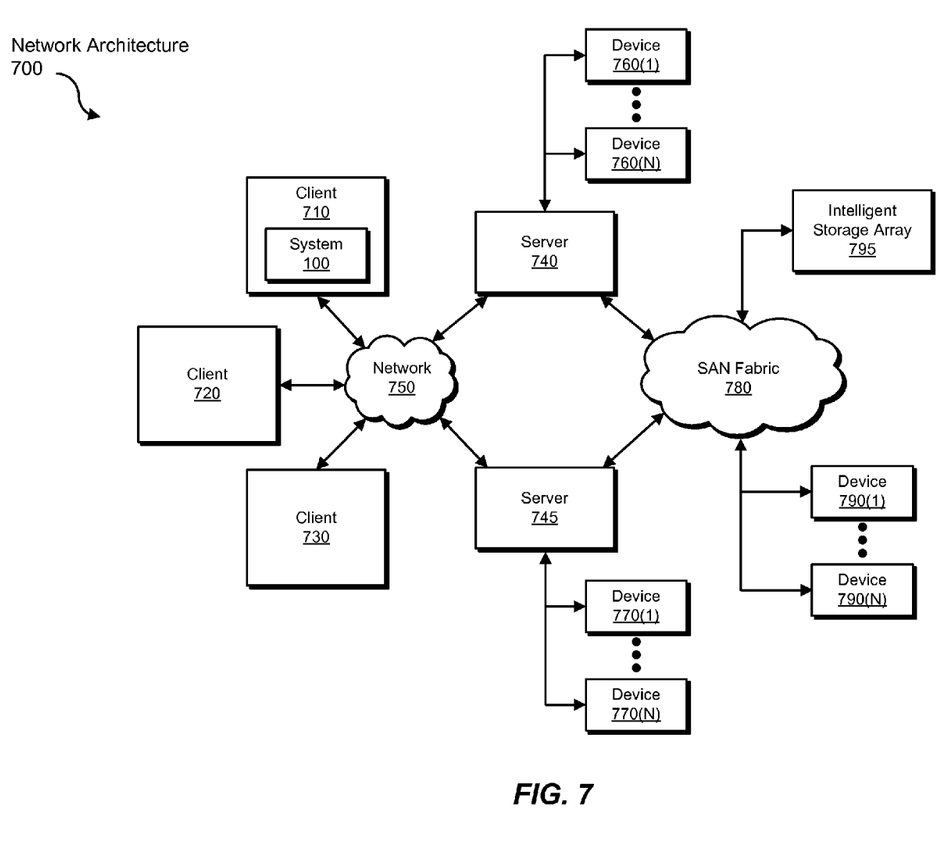
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting suspicious attempts to access data based on organizational relationships.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data associated with computing devices, organizational groups and sub-groups, and users to be transformed, transform the data to generate classification data, output a result of the transformation to an identifying module, use the result of the transformation to identify organizational relationships between computing devices and to determine whether attempts by computing devices within an organization to access other computing devices are suspicious, and store the result of the transformation to a database as directory service data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting suspicious attempts to access data based on organizational relationships, at least a portion of the method being performed by a computing device comprising at least one processor, the method comprising:
    detecting an attempt by a computing device within an organization to access an additional computing device within the organization;
    identifying, based on a directory service associated with the organization that classifies the computing device and the additional computing device, an organizational relationship between the computing device and the additional computing device;
    determining, based on the organizational relationship between the computing device and the additional computing device, that the attempt by the computing device to access the additional computing device is suspicious due at least in part to a device priority level assigned to the additional computing device exceeding a threshold device priority level;
    performing a security action in response to determining that the attempt by the computing device to access the additional computing device is suspicious.

2. The computer-implemented method of claim 1, wherein the directory service maps the organizational relationship between the computing device and the additional computing device.

3. The computer-implemented method of claim 1, wherein the directory service associates each of the computing device and the additional computing device with a different organizational group within the organization.

4. The computer-implemented method of claim 1, wherein determining that the attempt by the computing device to access the additional computing device is suspicious further comprises determining that the computing device is associated with a different organizational group than the additional computing device.

5. The computer-implemented method of claim 1, wherein performing the security action comprises notifying an administrator that the attempt by the computing device to access the additional computing device is suspicious.

6. The computer-implemented method of claim 5, wherein notifying the administrator comprises presenting to the administrator a graphic illustrating an organizational group within the organization that is associated with at least one of the computing device and the additional computing device.

7. The computer-implemented method of claim 1, further comprising determining a threat level for the attempt by the computing device to access the additional computing device.

8. The computer-implemented method of claim 7, wherein the threat level is determined by a device priority level assigned to the additional computing device.

9. The computer-implemented method of claim 7, wherein the threat level is determined based on a disparity between a device priority level assigned to the computing device and a device priority level assigned to the additional computing device.

10. The computer-implemented method of claim 7, wherein the security action is based on the threat level.

11. The computer-implemented method of claim 1, wherein data associated with the computing device and the additional computing device by the directory service includes at least one of:
    machine name;
    IP address;
    user name;
    organizational group name;
    device priority level;
    organizational group priority level.

12. A system for detecting suspicious attempts to access data based on organizational relationships, the system comprising:
    a detecting module, stored in memory, that detects an attempt by a computing device within an organization to access an additional computing device within the organization;
    an identifying module, stored in memory, that identifies, based on a directory service associated with the organization that classifies the computing device and the additional computing device, an organizational relationship between the computing device and the additional computing device;

a determining module, stored in memory, that determines, based on the organizational relationship between the computing device and the additional computing device, that the attempt by the computing device to access the additional computing device is suspicious due at least in part to a device priority level assigned to the additional computing device exceeding a threshold device priority level;

a security module, stored in memory, that performs a security action in response to determining that the attempt by the computing device to access the additional computing device is suspicious;

at least one physical processor that executes the detecting module, the identifying module, the determining module, and the security module.

13. The system of claim 12, wherein the determining module determines that the attempt by the computing device to access the additional computing device is suspicious by determining that the computing device is associated with a different organizational group than the additional computing device.

14. The system of claim 13, wherein the security module performs the security action by notifying an administrator that the attempt by the computing device to access the additional computing device is suspicious.

15. The system of claim 14, wherein the security module notifies the administrator by presenting to the administrator a graphic illustrating an organizational group within the organization that is associated with at least one of the computing device and the additional computing device.

16. The system of claim 12, wherein the determining module further determines a threat level for the attempt by the computing device to access the additional computing device.

17. The system of claim 16, wherein the security action is based on the threat level.

18. A non-transitory computer-readable medium comprising one or more computer-executable instructions that, when executed by at least one processor of a computing device, cause the computing device to:

detect an attempt by a computing device within an organization to access an additional computing device within the organization;

identify, based on a directory service associated with the organization that classifies the computing device and the additional computing device, an organizational relationship between the computing device and the additional computing device;

determine, based on the organizational relationship between the computing device and the additional computing device, that the attempt by the computing device to access the additional computing device is suspicious due at least in part to a device priority level assigned to the additional computing device exceeding a threshold device priority level;

perform a security action in response to determining that the attempt by the computing device to access the additional computing device is suspicious.

\* \* \* \* \*